United States Patent [19]
Kawai

[11] Patent Number: 4,634,639
[45] Date of Patent: Jan. 6, 1987

[54] ELECTROLUMINESCENT PANEL HAVING A LIGHT ABSORPTION LAYER OF GERMANIUM OXIDE

[75] Inventor: Hisao Kawai, Yamanashi, Japan

[73] Assignee: Hoya Corporation, Tokyo, Japan

[21] Appl. No.: 728,595

[22] Filed: Apr. 29, 1985

[30] Foreign Application Priority Data

Apr. 30, 1984 [JP] Japan .................................. 59-87363
Apr. 30, 1984 [JP] Japan .................................. 59-87364

[51] Int. Cl.[4] .......................... H01J 1/62; H01J 63/04; B32B 9/00; B32B 19/00

[52] U.S. Cl. ..................................... 428/690; 428/691; 428/917; 313/509; 313/503; 313/506

[58] Field of Search ........................ 313/509, 503, 506; 428/691, 690, 917

[56] References Cited

U.S. PATENT DOCUMENTS 3,030,541 4/1962 Hanlet ............................. 252/301 X
3,201,633 8/1965 Sieb ..................................... 313/509
3,560,784 2/1971 Steele et al. .................... 313/509 X
4,099,091 7/1978 Yamazoe et al. .................... 313/509
4,227,082 10/1980 Mayeux et al. .................. 250/336.1
4,287,449 9/1981 Takeda et al. ....................... 313/509
4,407,061 10/1983 Grodkiewicz et al. .......... 427/82 X
4,529,885 7/1985 Waite et al. ....................... 427/70 X
4,547,702 10/1985 Schrank ............................. 313/509

*Primary Examiner*—Nancy Swisher
*Attorney, Agent, or Firm*—Frishauf, Holtz, Goodman & Woodward

[57] ABSTRACT

In an electroluminescent panel comprising a transparent electrode, a back electrode, an electroluminescent layer between the transparent and the back electrodes, and a light absorption layer between the electroluminescent layer and the back electrode, the light absorption layer comprises a lower-order oxide of germanium and has a light absorption coefficient which is not smaller than $3.3 \times 10^{-4}$ $cm^{-1}$. The light absorption coefficient may be discretely or continuously increased from an electroluminescent layer side towards a back electrode side. The light absorption layer may be selectively deposited under the back electrode when it has a low resistivity.

8 Claims, 10 Drawing Figures

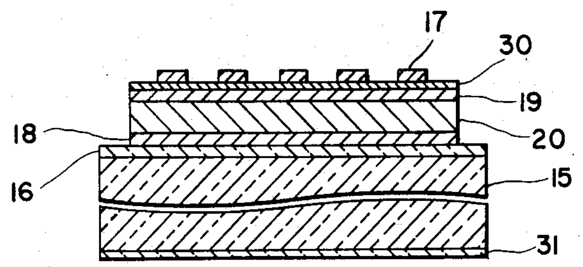
FIG. 4
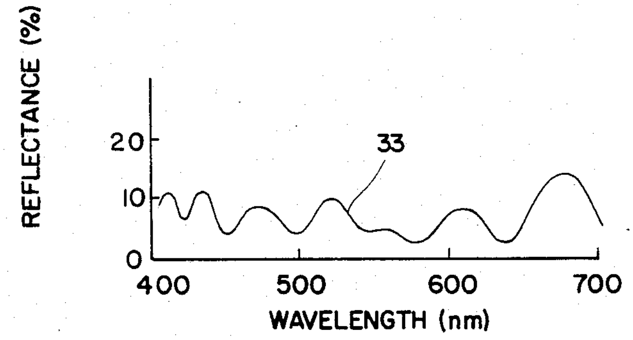
FIG. 5
FIG. 6
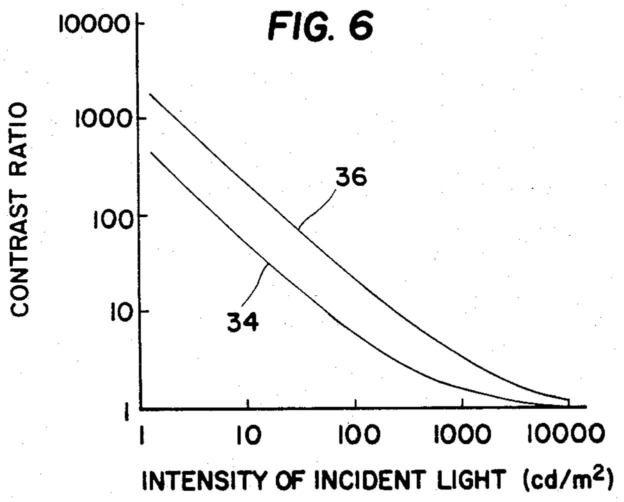

ELECTROLUMINESCENT PANEL HAVING A LIGHT ABSORPTION LAYER OF GERMANIUM OXIDE

BACKGROUND OF THE INVENTION

This invention relates to an electroluminescent panel for use in displaying an image, such as alphanumeric symbols, a static picture, a motion picture, and the like, in an input/output device of a computer, and the like.

As will later be described with reference to a few figures of the accompanying drawing, a conventional electroluminescent panel of the type described comprises a transparent substrate, a transparent or first electrode on the substrate, a second electrode opposite to the first electrode, and an electroluminescent layer between the first and the second electrodes.

With this structure, electroluminescent light is emitted from the electroluminescent layer and can be seen through the transparent substrate when an a.c. voltage is supplied between the first and the second electrodes.

It is mentioned here that the first electrode is nearer to the transparent substrate than the second electrode and will be called a front electrode while the second electrode is farther from the transparent substrate than the first electrode and will be called a back electrode.

In order to improve a contrast and a brightness of an image, the conventional electroluminescent panel comprises a light absorption layer of cadmium telluride (CdTe) between the electroluminescent layer and the back electrode. Practically, the light absorption layer has a high light absorption coefficient and serves to absorb external light which is incident onto the transparent substrate and which is directed towards the back electrode. It is needless to say that internal reflection of the electroluminescent light can also be avoided by the light absorption layer.

The light absorption layer is superposed on a dielectric layer. Superposition of the light absorption layer and the dielectric layer results in an increase of the a.c. voltage necessary for luminescence of the electroluminescent layer. This means that a brightness versus applied voltage characteristic is degraded by a stack of the light absorption layer. The increase of the a.c. voltage is liable to dielectric breakdown of the electroluminescent panel.

SUMMARY OF THE INVENTION

It is an object of this invention to provide an electroluminescent panel which is capable of improving brightness versus applied voltage characteristics.

It is another object of this invention to provide an electroluminescent panel of the type described, which can avoid dielectric breakdown of an electroluminescent panel.

It is yet another object of this invention to provide an electroluminescent panel of the type described, which has favorable contrast and brightness even by supply of a low voltage.

According to this invention, an electroluminescent panel comprises a transparent electrode, a back electrode opposite to the transparent electrode, an electroluminescent layer laid between the transparent and the back electrodes for emitting electroluminescent light, and a light absorption layer between the back electrode and the electroluminescent layer. The light absorption layer comprises a lower-order oxide of germanium represented by $GeO_x$ where x represents a positive number which is smaller than two.

BRIEF DESCRIPTION OF THE DRAWING

FIG. 4 is a sectional view of an electroluminescent panel according to a first embodiment of this invention;

FIG. 5 is a graph for use in describing a reflectance of the electroluminescent panel illustrated in FIG. 4;

FIG. 6 is another graph for use in describing a contrast ratio of the electroluminescent panel illustrated in FIG. 4;

DESCRIPTION OF THE PREFERRED EMBODIMENTS

Figure 1:
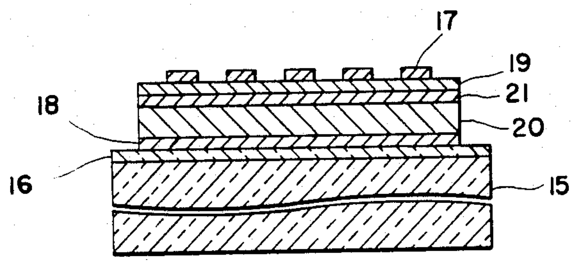
FIG. 1 PRIOR ART
FIG. 1 is a sectional view of a conventional electroluminescent panel.

Referring to FIG. 1, a conventional electroluminescent panel will at first be described for a better understanding of this invention. The illustrated electroluminescent panel comprises a glass substrate 15, a front or first electrode 16 of indium oxide ($In_2O_3$), stannic oxide ($SnO_2$), or the like, which is transparent, and a back or second electrode 17 of aluminum. The front electrode 16 is divided into a plurality of first conductors which are isolated from one another and which run from a righthand side of FIG. 1 to a lefthand side thereof. Likewise, the second conductor 17 is divided into a plurality of second conductors which are orthogonal to the first conductors and are therefore intersected with the first conductors at cross points.

First and second dielectric layers 18 and 19 are interposed between the first and the second electrodes 16 and 17 and are in contact with the first and the second electrodes 16 and 17, respectively, as illustrated in FIG. 1. Each of the first and the second dielectric layers 18 and 19 may be yttrium oxide ($Y_2O_3$), tantalum pentoxide ($Ta_2O_5$), or the like. In the example being illustrated, an electroluminescent layer 20 and a light absorption layer 21 are sandwitched between the first and the second electrodes 16 and 17 and brought into contact with each other. In addition, the electroluminescent layer 20 and the light absorption layer 21 are in contact with the first and the second dielectric layers 18 and 19, respectively.

The electroluminescent layer 20 comprises a base material and an activator. The base material may be zinc sulfide (ZnS) or zinc selenide (ZnSe) while the activator may be selected from a group consisting of manganese (Mn), terbium (Tb), samarium (Sm), copper (Cu), aluminum (Al), and bromine (Br). The activator is usually added to the base material by 0.1–2% by weight.

The light absorption layer 21 may be of cadmium telluride (CdTe) and has a resistivity of $10^8$ Ω·cm.

With this structure, the electroluminescent layer 20 emits electroluminescent light at the cross points of the first and the second conductors by application of an electric voltage. The electroluminescent light is directed towards the front electrode 16 and the substrate 15 to display a visible image. This is because electrons are excited from a ground state to a conduction band by an electric field and are accelerated to stimulate luminescent centers formed by the activator. Such stimulated luminescent centers emit the electroluminescent light when they return back to the ground state.

Disposition of the light absorption layer 21 serves to absorb external light incident through the transparent substrate 15 and to avoid internal reflection of the electroluminescent light directed towards the back electrode 17.

It should be recollected here that the illustrated light absorption layer 21 underlies the second dielectric layer 19 and is in contact with the electroluminescent layer 20.

Figure 2:
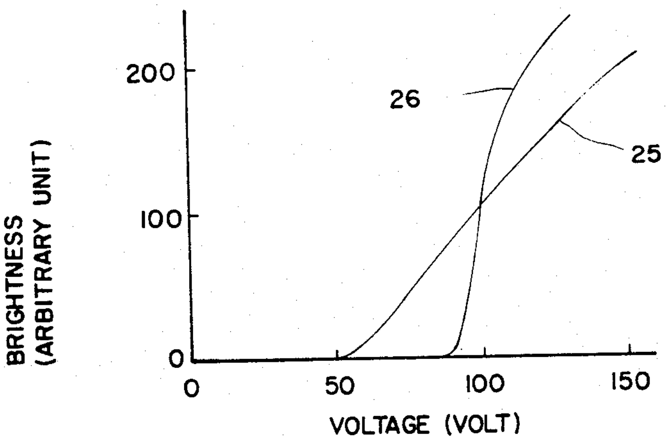
FIG. 2 PRIOR ART
FIG. 2 is a graphical representation for use in describing brightness versus applied voltage characteristics of conventional electroluminescent panels.

Referring to FIG. 2, the electroluminescent panel illustrated in FIG. 1 shows a brightness versus applied voltage characteristic as exemplified by a curve 25. As is apparent from the curve 25, the brightness is slowly increased with an increase of the voltage. This means that a high voltage should be supplied between the front and the back electrodes 16 and 17 so as to obtain a desired brightness. Supply of such a high voltage may bring about dielectric breakdown of light emitting regions.

Figure 3:
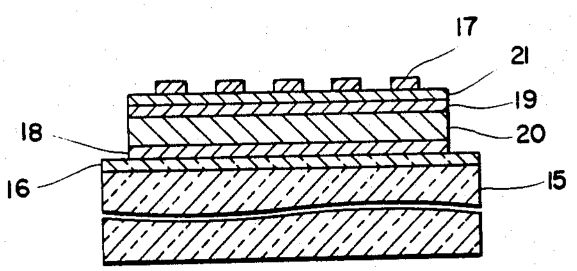
FIG. 3 PRIOR ART
FIG. 3 is a sectional view of another one of the conventional electroluminescent panels.

Referring to FIG. 3, another conventional electroluminescent panel is similar in structure to that illustrated in FIG. 1 except that the second dielectric layer 19 and the light absorption layer 21 are overturned relative to those illustrated in FIG. 1, respectively. Consequently, the second dielectric layer 19 underlies the light absorption layer 21 and is in contact with the electroluminescent layer 20. On the other hand, the light absorption layer 21 is in contact with the second or back electrode 17.

With this structure, it is possible to sharply increased the brightness versus applied voltage characteristic, as exemplified by a curve 26 in FIG. 2. However, a threshold voltage of the electroluminescent panel becomes high because the light absorption layer 21 has a high resistivity. In order to obtain a desired brightness, a high voltage should therefore be applied between the front and the back electrodes 16 and 17. Application of such a high voltage tends to induce the dielectric breakdown.

Referring to FIG. 4, an electroluminescent panel according to a first embodiment of this invention comprises similar parts designated by like reference numerals. In FIG. 4, a light absorption layer 30 is deposited on the second dielectric layer 19 and underlies the second electrode 17, like in FIG. 3. The light absorption layer 30 is deposited to a thickness of about 1,000 angstroms in a manner to be described later.

The front electrode 16 is deposited on an upper surface, namely, back surface of the transparent substrate 15. Thereafter, the first and the second dielectric layers 18 and 19, the electroluminescent layer 20, the light absorption layer 30, and the back electrode 17 are deposited on the front electrode 16.

In the example being illustrated, an antireflection layer 31 is deposited on a lower or front surface of the transparent substrate 15 so as to reduce reflection of external light incident on the front surface. Thus, the antireflection layer 31 is placed on a front side of the electroluminescent panel and may be of magnesium fluoride ($MgF_2$). The illustrated antireflection layer 31 is deposited to a thickness of 1,000 angstroms.

The illustrated electroluminescent panel is manufactured in the following manner. At first, the transparent substrate 15 is prepared which may be of aluminosilicate glass, such as NA-40 manufactured and sold by HOYA Corporation, Tokyo. The front or first electrode 16, the first dielectric layer 18, the electroluminescent layer 20, and the second dielectric layer 19 are successively deposited on the back surface of the transparent substrate 15 by vacuum evaporation. The first electrode 16 may be of indium tin oxide and has a thickness of 2,000 angstroms. Each of the first and the second dielectric layers 18 and 19 may be of yttrium oxide ($Y_2O_3$) and has a thickness of 3,000 angstroms. The electroluminescent layer 20 is 6,000 angstroms thick and is deposited by the use of a pellet of ZnS:Mn comprising by weight 0.5% of Mn.

Subsequently, the light absorption layer 30 is deposited on the second dielectric layer 19 at a deposition rate of 1 angstrom/second by reactive evaporation method. In this event, an evaporation source of germanium (Ge) is heated by an electron beam at an oxygen partial pressure of $5\times10^{-5}$ Torr at a substrate temperature of 350° C. Thus, it has been found out that the light absorption layer 30 comprises a lower-order oxide of germanium represented by $GeO_x$ where x represents a positive number smaller than two.

The second or back electrode 17 of aluminum is thereafter deposited to a thickness of 3,000 angstroms by vacuum evaporation. The antireflection layer 31 of magnesium fluoride is also deposited by vacuum evaporation. The first electrode 16 comprises a plurality of first conductors orthogonal to second conductors of the second electrode 17, as mentioned in conjunction with FIG. 1.

When the a.c. voltage of a 100 Hz sine wave is supplied between the first and the second electrodes 16 and 17, the illustrated electroluminescent panel is luminous in a yellowish orange color at a brightness of 150 cd/m$^2$ to emit electroluminescent light. The electroluminescent light has a peak wavelength of 580 nm. No crosstalk takes place among adjacent ones of the cross points of the first and the second conductors. This is because the light absorption layer 30 has a sheet resistance as large as about $10^9$ Ω/□ and serves to protect, on excitation of a desired cross point, the adjacent cross points from being objectionably excited. In addition, the light absorption layer 30 is 1,000 angstroms thick and has a resistivity of $10^4$ Ω·cm. The resistivity of $10^4$ Ω·cm is low as compared with the second dielectric layer 19. This means that the light absorption layer does not increase the threshold voltage of the electroluminescent panel and that the illustrated electroluminescent panel exhibits a sharp brightness versus applied voltage characteristic as exemplified by the curve 26 in FIG. 2.

From this fact, it is readily understood that the desired brightness is accomplished by supply of a low voltage and dielectric breakdown can be avoided.

In general, it is possible to evaluate a light absorption layer by a light absorption ratio A dependent on a light absorption coefficient α and a thickness d of the light absorption layer. More specifically, the light absorption ratio A is given by:

$$A=1-\exp(-\alpha d). \quad (1)$$

In order to obtain a sufficient contrast, the light absorption layer has preferably a light absorption ratio A of 80% or more at a wavelength of 580 nm. The thickness d should practically be determined in consideration of light absorption and an evaporation time and may be selected between 500 angstroms and 5,000 angstroms. A minimum value of the light absorption coefficient $\alpha$ is determined so as to accomplish the light absorption ratio A of 80% when the thickness d is equal to 5,000 angstroms. From Equation (1), it is obvious that the minimum value of the light absorption coefficient $\alpha$ is equal to $3.3\times10^4$ cm$^{-1}$. Accordingly, the light absorption layer is effective if it has a light absorption coefficient which is not smaller than $3.3\times10^4$ cm$^{-1}$ for the wavelength of 580 nm.

It has been found out that the light absorption layer 30 illustrated in FIG. 4 has the light absorption coefficient $\alpha$ of $2\times10^5$ cm$^{-1}$ and the light absorption ratio A of 86%. Therefore, the illustrated light absorption layer 30 can effectively absorb incident light.

The incident light is reflected by the first and second boundaries or interfaces between the second dielectric layer 19 and the light absorption layer 30 and between the light absorption layer 30 and the second electrode 17, respectively. Preferably, the reflection is low so as to obtain high contrast. Reflectivity $r_1$ in the first boundary is determined by:

$$r_1=((n_1-n_2)^2+k_2^2)/(n_1+n_2)^2+k_2^2), \quad (2)$$

where $n_1$ and $n_2$ are representative of refractive indices of the second dielectric layer 19 and the light absorption layer 30, respectively, and $k_2$ is representative of an extinction coefficient of the light absorption layer 30.

In the example being illustrated, the refractive indices $n_1$ and $n_2$ are equal to 1.9 and 3.8 and the extinction coefficient $k_2$ is equal to 0.8. Therefore, the reflectivity $r_1$ can be reduced to 12.8%.

Reflected light from the second boundary is absorbed by the light absorption layer 30 again and is thereafter incident onto the second dielectric layer 19. The reflected light is therefore represented by $\exp(-2\alpha d)$ and becomes equal to 0.018 and becomes less than 2%.

Thus, it is possible for the illustrated electroluminescent panel to absorb any internal reflections and to thereby reduce internal reflectivity.

Furthermore, the contrast is evaluated by a contrast ratio C given by:

$$C=(I\cdot r+B)/(I\cdot r), \quad (3)$$

where I is indicative of an intensity of incident light; r, a reflectance on the front side of the electroluminescent panel; and B, a brightness.

Referring to FIG. 5, the electroluminescent panel illustrated in FIG. 4 exhibits a reflectance characteristic as exemplified by a curve 33. An average reflectance is equal to 7% within a range between 400 nm and 700 nm. In Equation (3), the reflectance r may be considered to be 7%.

Referring to FIG. 6, relationships between the intensity I of incident light and the contrast ratio C is illustrated so as to specify a merit of the light absorption layer 30 illustrated in FIG. 4 and may be called contrast characteristics. In FIG. 6, a curve 34 shows the contrast characteristic which is given when the light absorption layer 30 is removed from the electroluminescent panel illustrated in FIG. 4. On the other hand, a curve 36 shows the contrast characteristic of the electroluminescent panel according to this invention. From comparison of the curves 34 and 36, it is readily understood that the contrast characteristic is considerably improved by presence of the light absorption layer 30.

Figure 7:
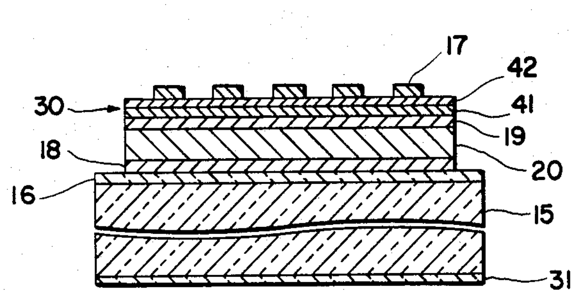
FIG. 7 is a sectional view of an electroluminescent panel according to a second embodiment of this invention.

Referring to FIG. 7, an electroluminescent panel according to a second embodiment of this invention comprises similar parts designated by like reference numerals. The illustrated light absorption layer 30 comprises a first absorption film 41 adjacent to the second dielectric layer 19 and a second absorption film 42 which is in contact with the first absorption film 41 and is adjacent to the second electrode 17. Thus, the first absorption film 41 provides a first surface directed towards the second dielectric layer 19 while the second absorption film 42 provides a second surface directed towards the second electrode 17.

More particularly, each of the first and the second absorption films 41 and 42 comprises a lower-order oxide of germanium like the light absorption layer 30 illustrated in FIG. 4 but has a light absorption coefficient $\alpha$ different from each other. For example, the light absorption coefficients $\alpha$ of the first and the second absorption films 41 and 42 are equal to $0.7\times10^5$ cm$^{-1}$ and $2\times10^5$ cm$^{-1}$, respectively, for a wavelength of 580 nm. Anyway, the second absorption film 42 has the light absorption coefficient $\alpha$ greater than the first absorption film 41. From this fact, it is readily understood that the light absorption coefficient $\alpha$ may increase from the first surface to the second surface in the illustrated light absorption layer 30.

The first and the second absorption films 41 and 42 are deposited to 500 angstroms and 800 angstroms, respectively, in a manner to be described later, and have sheet resistances of about $2\times10^{10}$ Ω/□ and $10^9$ Ω/□, respectively. In this connection, the resistivities of the first and the second absorption films 41 and 42 are equal to $10^5$ Ω·cm and $8\times10^3$ Ω·cm, respectively.

Like the electroluminescent panel illustrated in FIG. 4, the antireflection layer 31 of magnesium fluoride is attached to the front or lower surface of the transparent substrate 15.

Figure 8:
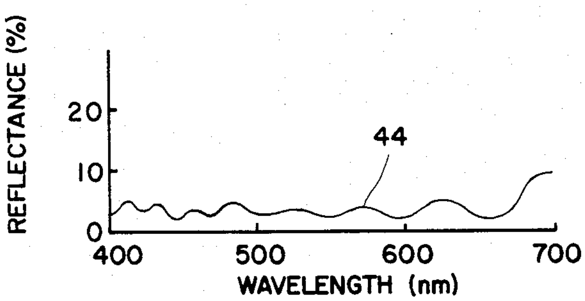
FIG. 8 is a graph for use in describing a reflectance of the electroluminescent panel of FIG. 7.

Temporarily referring to FIG. 8, the electroluminescent panel illustrated in FIG. 7 has a reflection characteristic which is exemplified by a curve 44 in FIG. 8 and which is substantially uniform in a wavelength range between 400 nm and 700 nm. The reflection characteristic is measured on the front side of the electroluminescent panel like in FIG. 5. In the above-mentioned wavelength range, the electroluminescent panel of FIG. 7 has an average reflectance of 4% smaller than that of the electroluminescent panel illustrated in FIG. 4. This is because a combination of the first and the second absorption films 41 and 42 has a large absorption ratio A in comparison with the light absorption layer 30 illustrated in FIG. 4.

The illustrated electroluminescent panel has an improved contrast ratio in comparison with that shown at the curve 36 in FIG. 6. In addition, no crosstalk takes place between picture element appearing at the cross points of the first and the second conductors because the second absorption film 42 has a high sheet resistance, such as $10^9$ Ω/□.

Practically, the electroluminescent light emanates from the electroluminescent panel at a brightness of 140

$cd/m^2$ and has a peak wavelength of 580 nm when an a.c. voltage of 100 Hz is supplied between the front and the back electrodes 16 and 17. Inasmuch as the first and the second absorption films 41 and 42 have low resistivities in comparison with the conventional absorption layer 21 of CdTe, the first and the second absorption films 41 and 42 does not act as a dielectric layer, such as the light absorption layer 21 of CdTe. As a result, the a.c. voltage is effectively utilized and may therefore be a low voltage. Thus, it is possible to reduce a threshold voltage of luminescence and to protect dielectric breakdown or breakage of the light emitting regions.

The first and the second absorption films 41 and 42 are formed within a vacuum chamber by reactive evaporation like the light absorption layer 30 illustrated in FIG. 4. It has been found out that the light absorption coefficient $\alpha$ is variable by controlling a partial pressure of oxygen in the vacuum chamber and a deposition rate of germanium oxide ($GeO_x$). For example, the first absorption film 41 is deposited at the deposition rate of 1 angstrom/sec with the partial pressure of oxygen kept at $1\times10^{-4}$ Torr. In this event, the transparent substrate 15 is kept at a temperature of 350° C. On the other hand, the partial pressure of oxygen is changed from $1\times10^{-4}$ Torr to $5\times10^{-5}$ Torr on deposition of the second absorption film 42 with the above-mentioned temperature kept unchanged. The light absorption coefficients of the resultant first and second absorption films 41 and 42 are rendered into $0.7\times10^5$ cm$^{-1}$ and $2\times10^5$ cm$^{-1}$, respectively.

It has been confirmed that the light absorption coefficient $\alpha$ becomes equal to $3\times10^5$ cm$^{-1}$ when an absorption film is deposited at the deposition rate of 2 angstroms/sec with the partial pressure of oxygen kept at $3\times10^{-5}$ Torr. The absorption film is excellent in light absorption coefficient $\alpha$ rather than the above-mentioned second absorption film 42 but has a low sheet resistance of about $10^8$ Ω/□. Such a low sheet resistance may induce any crosstalk between adjacent picture elements.

Figure 9:
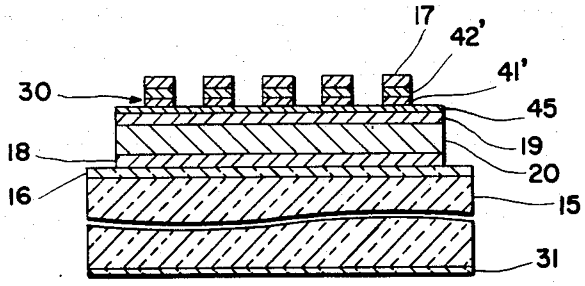
FIG. 9 is a sectional view of an electroluminescent panel according to a third embodiment of this invention.

Referring to FIG. 9, an electroluminescent panel according to a third embodiment of this invention is beneficial to prevention of crosstalk. The illustrated electroluminescent panel comprises a light absorption layer 30 divided into a plurality of partial absorption layers selectively formed under the second conductors of the second or back electrode 17. Each of the partial absorption layers comprises a stack of first and second divided films 41' and 42' similar to the first and the second absorption films 41 and 42 of FIG. 7. The stacks may have resistivities lower than the first and the second absorption films 41 and 42 illustrated in FIG. 7.

From this fact, it is seen that the first and the second divided films 41' and 42' are formed by selectively etching the first and the second absorption films 41 and 42 (FIG. 7). The selective etching can be carried out by nitric acid. In this event, the back electrode 17 serves as a mask.

During the selective etching of the light absorption layer 30, the second dielectric layer 19 of $Y_2O_3$ may be undesiredly etched out together with the light absorption layer 30. In order to avoid such undesired etching, an etching resistant dielectric layer 45 of hafnium oxide uniformly underlies the light absorption layer 30. The etching resistant dielectric layer 45 may be deposited to a thickness of 1,000 angstroms by reactive evaporation.

Thus, some parts of the light absorption layer 30 remain only under the second conductors of the back electrode 17 and intersect to the first conductors of the front electrode 16 at the cross points. With this structure, no crosstalk occurs between adjacent ones of the picture elements appearing at the cross points. Therefore, the first and the second divided films 41' and 42' may have low resistivities, such as $10^5$ Ω·cm and 800 Ω·cm, respectively.

Figure 10:
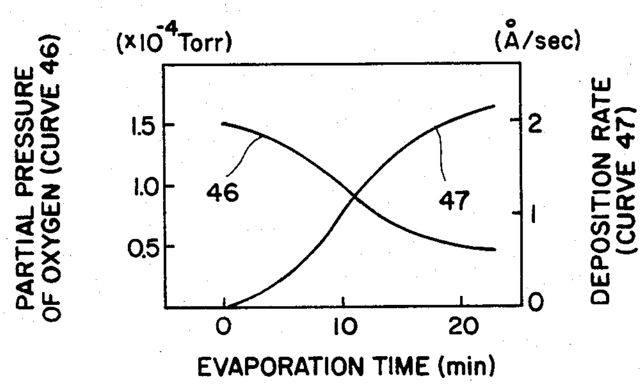
FIG. 10 is a graphical representation for use in describing a method of manufacturing the electroluminescent panels illustrated in FIGS. 7 and 8.

Referring to FIG. 10, description will be made as regards a method of increasing the light absorption coefficient $\alpha$ of the light absorption layer 30 (FIGS. 7 and 9) from the first surface of the light absorption layer 30 to the second surface thereof. In FIG. 10, the increase of the light absorption coefficient $\alpha$ can be accomplished either by gradually reducing the partial pressure of oxygen from $1.5\times10^{-4}$ Torr to $0.5\times10^{-4}$ Torr with time, as exemplified by a curve 46, or by gradually increasing the deposition rate from 0 to 2 angstroms/sec with time. According to this method, it is possible to continuously monotonously increase the light absorption coefficient $\alpha$ in the light absorption layer 30. In addition, the light absorption coefficient $\alpha$ can be discretely and monotonously increased by stepwise switching the partial pressure of oxygen or the deposition rate from one to another at a time instant determined within an evaporation time of, for example, 20 minutes.

The increase of the light absorption coefficient can also be possible by changing the temperature of the substrate from a high temperature to a low one.

While this invention has thus far been described in conjunction with a few embodiments thereof, it will readily be possible for those skilled in the art to put this invention into practice in various other manners. For example, each of the first and the second dielectric layers may be of oxides, such as tantalum pentoxide ($Ta_2O_5$), aluminum oxide ($Al_2O_3$), hafnium oxide ($HfO_2$), or silicon nitride ($Si_3N_4$). The back electrode may be of a metal selected from a group consisting of tantalum (Ta), molybdenum (Mo), iron (Fe), nickel (Ni), and nickel chromium (NiCr). The second dielectric layer 19 may be used in common to the etching resistant dielectric layer 45 (FIG. 9) when the second dielectric layer 19 is of tantalum pentoxide or hafnium oxide. The transparent substrate 10 may be, for example, of soda-lime glass, quartz, or the like. The first or transparent electrode 11 may be of indium oxide ($In_2O_3$), a combination of indium oxide and tungsten (W), or stannic oxide ($SnO_2$) which contains antimony (Sb) and fluorine (F). As regards the electroluminescent layer 14, the base material may be zinc selenide (ZnSe) or a compound of zinc sulfide (ZnS) and zinc selenide (ZnSe). The activator may be selected from a group of manganese, copper, aluminum, rare earth elements, halogens, and the like. For example, addition of copper or aluminum to zinc sulfide gives a yellowish green color while addition of copper or bromine to zinc sulfide or zinc selenide provides a green color. Furthermore, addition of samarium, terbium, and thulium to zinc sulfide gives red, green, and blue colors, respectively. Finally, the electroluminescent panel may be of a multicolor type.

What is claimed is:

1. An electroluminescent panel comprising:

a transparent electrode;

a back electrode opposite to said transparent electrode;

an electroluminescent layer laid between said transparent and said back electrodes for emitting electroluminescent light; and a light absorption layer between said back electrode and said electroluminescent layer, said light absorption layer essentially consisting of a lower-order oxide of germanium represented by $GeO_x$ where x represents a positive number which is smaller than two.

2. An electroluminescent panel as claimed in claim 1, wherein said light absorption layer has a light absorption coefficient which is not smaller than $3.3\times10^4$ $cm^{-1}$ for the electroluminescent light of 580 nm.

3. An electroluminescent panel as claimed in claim 1, wherein said light absorption layer has a first surface directed towards said electroluminescent layer, a second surface directed towards said back electrode, and a light absorption coefficient which increases from said first surface to said second surface.

4. An electroluminescent panel as claimed in claim 3, wherein said light absorption coefficient is continuously varied from said first surface to said second one.

5. An electroluminescent panel as claimed in claim 3, wherein said light absorption coefficient is discretely varied from said first surface to said second surface.

6. An electroluminescent panel as claimed in claim 3, wherein said light absorption layer comprises a first and a second film which have said first and said second surfaces, respectively, and are in contact with each other.

7. An electroluminescent panel as claimed in claim 3, wherein:

said back electrode comprises a plurality of conductors;

said light absorption layer comprising a plurality of partial absorption layers selectively formed only under said conductors, respectively.

8. An electroluminescent panel as claimed in claim 7, further comprising:

an etching resistant dielectric layer which is between said back electrode and said light absorption layer and which is capable of withstanding an etchant used in forming said partial absorption layers.

* * * * *